United States Patent [19]

Rose

[11] Patent Number: 4,583,421
[45] Date of Patent: Apr. 22, 1986

[54] POWERED ADJUSTER FOR THREE-POINT HITCH UPPER ARM

[76] Inventor: Marvin D. Rose, Rte. 4, Kearney, Nebr. 68847

[21] Appl. No.: 690,725

[22] Filed: Jan. 11, 1985

[51] Int. Cl.⁴ .............................................. G05G 1/00
[52] U.S. Cl. ..................................... 74/586; 172/439; 180/53.3; 280/461 A
[58] Field of Search ................. 74/586; 172/272, 439, 172/446; 280/461 A; 180/53.3

[56] References Cited

U.S. PATENT DOCUMENTS

| | | | |
|---|---|---|---|
| 1,935,607 | 11/1933 | Anderson | 74/586 X |
| 2,786,364 | 3/1957 | Sawyer | 74/586 |
| 3,132,532 | 5/1964 | Polanin | 74/586 |
| 3,319,488 | 5/1967 | Bentley | 74/586 |

Primary Examiner—Harold W. Weakley
Attorney, Agent, or Firm—Zarley, McKee, Thomte, Voorhees & Sease

[57] ABSTRACT

A powered adjuster for a three-point hitch upper arm includes a housing adapted for rotatably supporting a drive hub having opposite ends with oppositely threaded openings for receiving the oppositely threaded connection members of a three-point hitch upper arm. A motor is supported on the housing and a drive connection is provided for rotating the drive hub in response to actuation of the motor. Finally, a coacting guide mechanism is provided on the housing and one of the connections members for preventing relative rotation between the housing and connection member while permitting relative axial sliding movement therebetween to accommodate powered extension and retraction of the upper arm by the adjuster of the invention.

13 Claims, 4 Drawing Figures

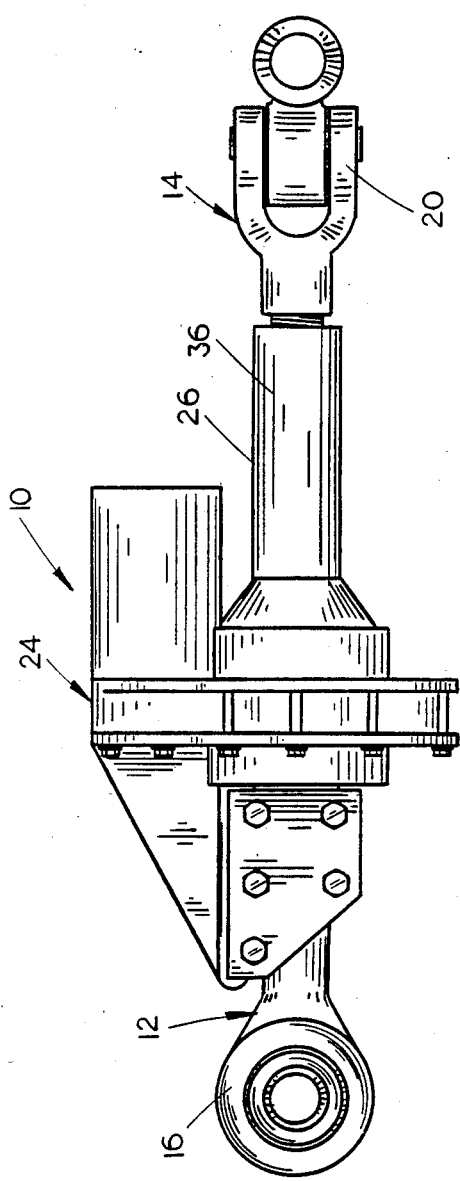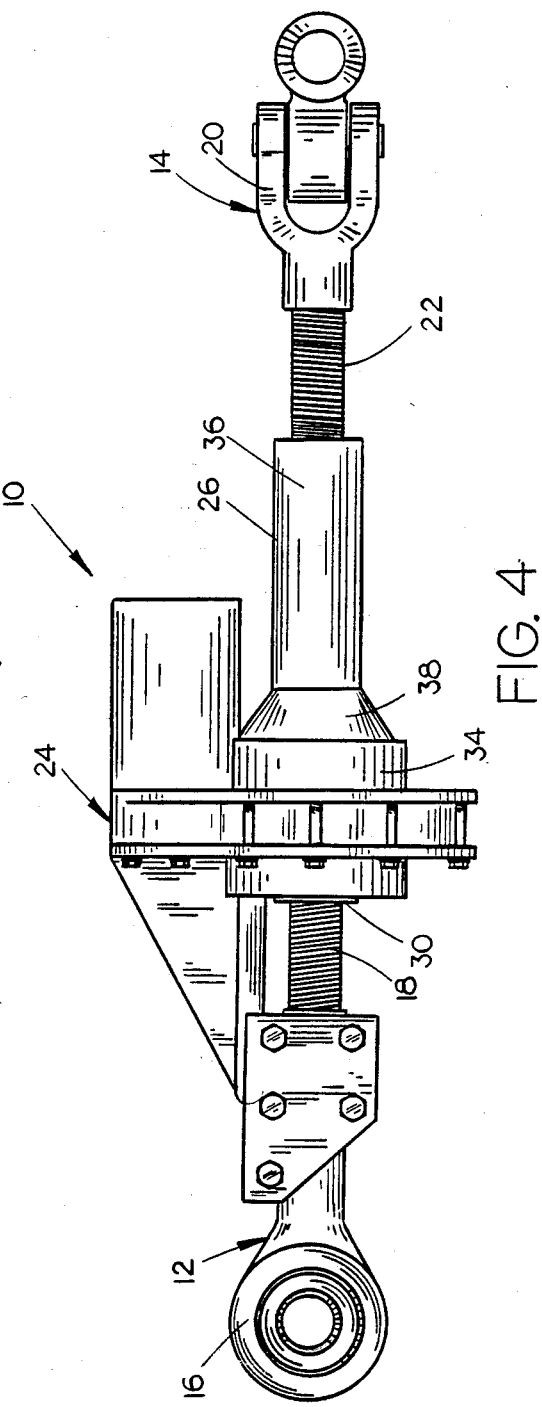

POWERED ADJUSTER FOR THREE-POINT HITCH UPPER ARM

BACKGROUND OF THE INVENTION

The present invention is directed generally to three-point hitches such as those commonly found on agricultural tractors, and more particularly to an improved three-point hitch upper arm including a powered adjuster for automatically and precisely adjusting the length of the upper arm.

With a conventional three-point hitch, an implement tool bar is supported at three points by a pair of spaced-apart lower arms and a central and higher upper arm. The lower arms, of course, are pivotally raised and lowered either by hydraulic cylinders or by lift arms connected to powered cranks on the back of a tractor. Whereas the lift arms control raising and lowering of an implement between its working and transport positions, the length of the upper arm is adjusted to fit the angle of the implement in its working position.

The adjustment of the length of the upper arm is critical in certain operations such as plowing wherein the plow must "suck in" to one side to operate properly. If the front-to-back inclination of the plow is not just right, it will not operate effectively. Accordingly, a farmer would normally attach the implement to the tractor three-point hitch and simply eyeball the length of the upper arm to what he thinks is the right adjustment and then proceed across a field a short way, stop the tractor, get out and manually adjust the length of the upper arm by applying a wrench to the turnbuckle collar, then climb back aboard the tractor and do the same thing again until the implement is just right. Particularly with the new large tractors, constant mounting and dismounting of the tractor is a terribly exerting and inconvenient manuever.

It has previously been known to substitute a length adjustable hydraulic cylinder in place of the conventional turnbuckle for the upper arm or middle length of the three-point hitch connection to an implement. It is difficult, if not impossible, to precisely control the extension and retraction of the cylinder, however, since it occurs in somewhat jerking steps of unpredictable length. This type of powered link is therefore generally unacceptable for applications where precise adjustment is required.

Accordingly, a primary object of the invention is to provide an improved powered adjuster for a three-point hitch upper arm.

Another object is to provide a powered adjuster capable of precisely controlling the extension and retraction of the upper arm length.

Another object is to provide such a powered adjuster having means for identifying selected positions thereof whereby the upper arm may be readjusted to a selected position without further experimentation.

Another object is to provide such a powered adjuster which is adaptable for use with the pair of male threaded connection members of a conventional turnbuckle style upper arm.

Another object is to provide such a powered adjuster for a three-point hitch upper arm which is simple and rugged in construction, economical to manufacture and efficient in operation.

SUMMARY OF THE INVENTION

The powered adjuster for a three-point hitch upper arm, according to the present invention, includes a housing having a drive hub rotatably carried therein. The drive hub has opposite ends with oppositely threaded openings for receiving the oppositely threaded connection members of a three-point hitch upper arm. A motor is supported on the housing and is operatively connected to the drive hub for rotating the same in response to actuation of the motor.

Finally, a coacting guide means is provided on the housing on at least one of the connection members for preventing relative rotation between the housing and connection members while permitting relative axial sliding movement therebetween.

The motor is preferably a reversible hydraulic motor having a relatively small drive gear disposed in meshed relation with a relatively larger driven gear fixed on the drive hub for rotation therewith. The sensitive control of the rotation of the hydraulic motor and the step up gearing in the connection to the drive hub afford sensitive and precise control over the length adjustability of the upper arm including the powered adjuster of the present invention.

A number of threads visible on the exposed ends of the connection members afford an accurate indication of a particular setting for the length of the upper arm whereby a simple counting of threads is all that is required to return the upper arm to that selected position without any need for further experimenting. Alternately, a digital indicator could be provided for remote indication of the upper arm setting.

The hydraulic valve for controlling the hydraulic motor is generally situated at the rear of a tractor and is manually operable at that location. By substituting an electric solenoid control valve, the length of the upper arm can be easily remotely controlled from the tractor cab thereby eliminating any need for the farmer to repeatedly dismount for adjusting the length of the three-point hitch upper arm.

BRIEF DESCRIPTION OF THE DRAWINGS

FIG. 3 is a side elevational view of the powered adjuster with the connection members in fully retracted positions; and FIG. 4 is a side elevational view with the connection members in extended positions thereof.

DESCRIPTION OF THE PREFERRED EMBODIMENT

Figure 2:
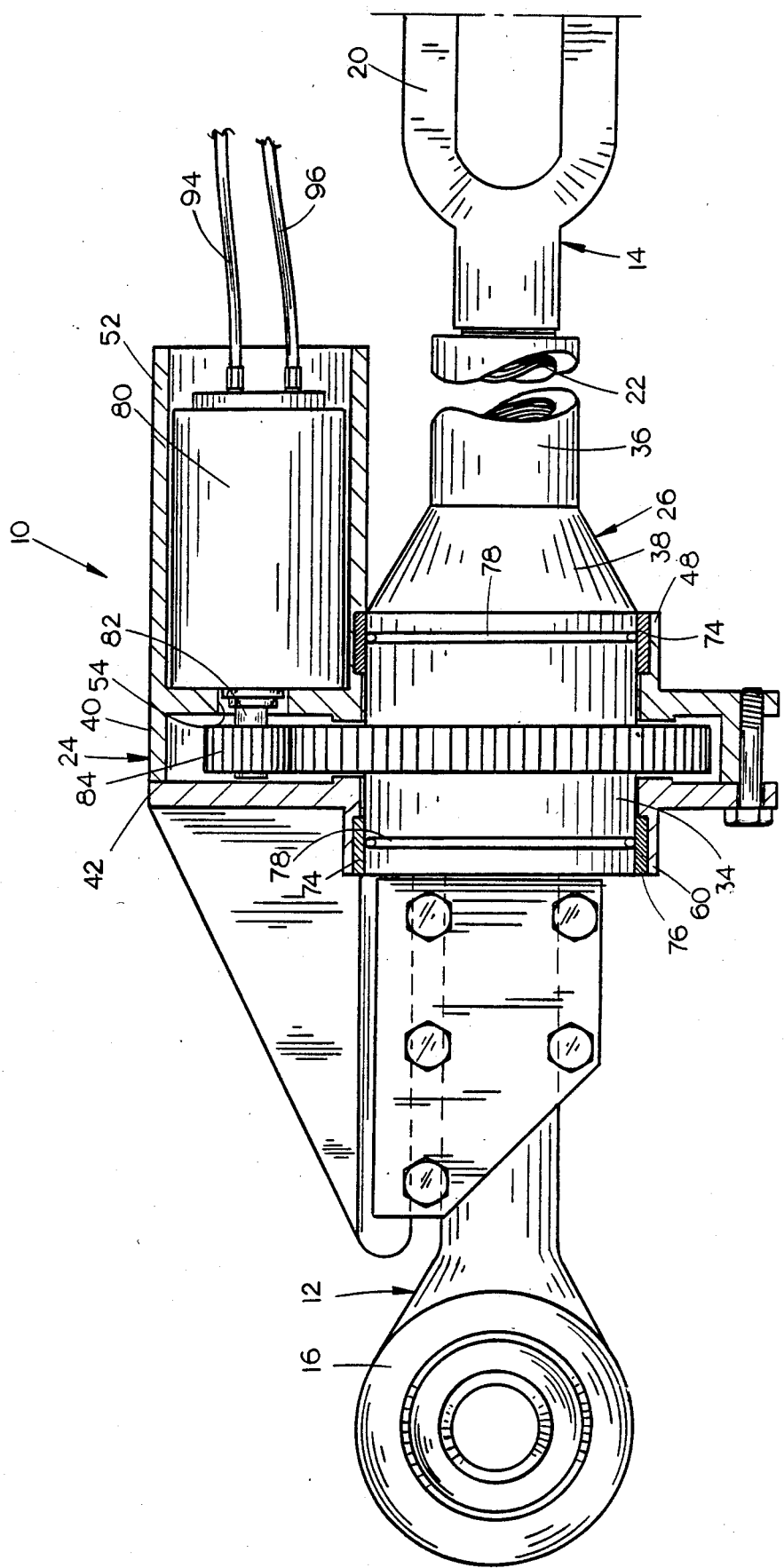
FIG. 2 is an enlarged partially sectional side view of the powered adjuster with the opposite connection members assembled therewith.

The power adjuster 10 of the present invention is illustrated in FIGS. 2-4 in assembly relation with conventional connection members 12 and 14 of a turnbuckle type three-point hitch upper arm. Connection member 12 includes a ball and socket type connector 16 at one end and male screw threads 18 (FIG. 4) at the opposite end. Likewise, connection member 14 has a yoke type connector 20 at one end and oppositely threaded male screw threads 22 at the opposite end. These connection members 12 and 14 may be of the conventional design adapted for use with a manually adjustable turnbuckle. Because these connection members are relatively expensive parts, a significant savings is achieved by the adaptability of the powered adjuster 10 for use with the existing upper arm connection members on tractors equipped with a three-point hitch.

The powered adjuster 10 includes a housing 24 which supports a drive hub 26 for rotation about a first axis 28. Drive hub 26 has opposite ends with oppositely threaded openings 30 and 32 arranged concentric with first axis 28 for threadably receiving the first and second connection members 12 and 14 respectively.

Drive hub 26 includes a relatively large diameter end portion 34, an opposite relatively smaller diameter end portion 36 and a generally frusto-conical medial portion 38 interconnecting the end portions.

Figure 1:
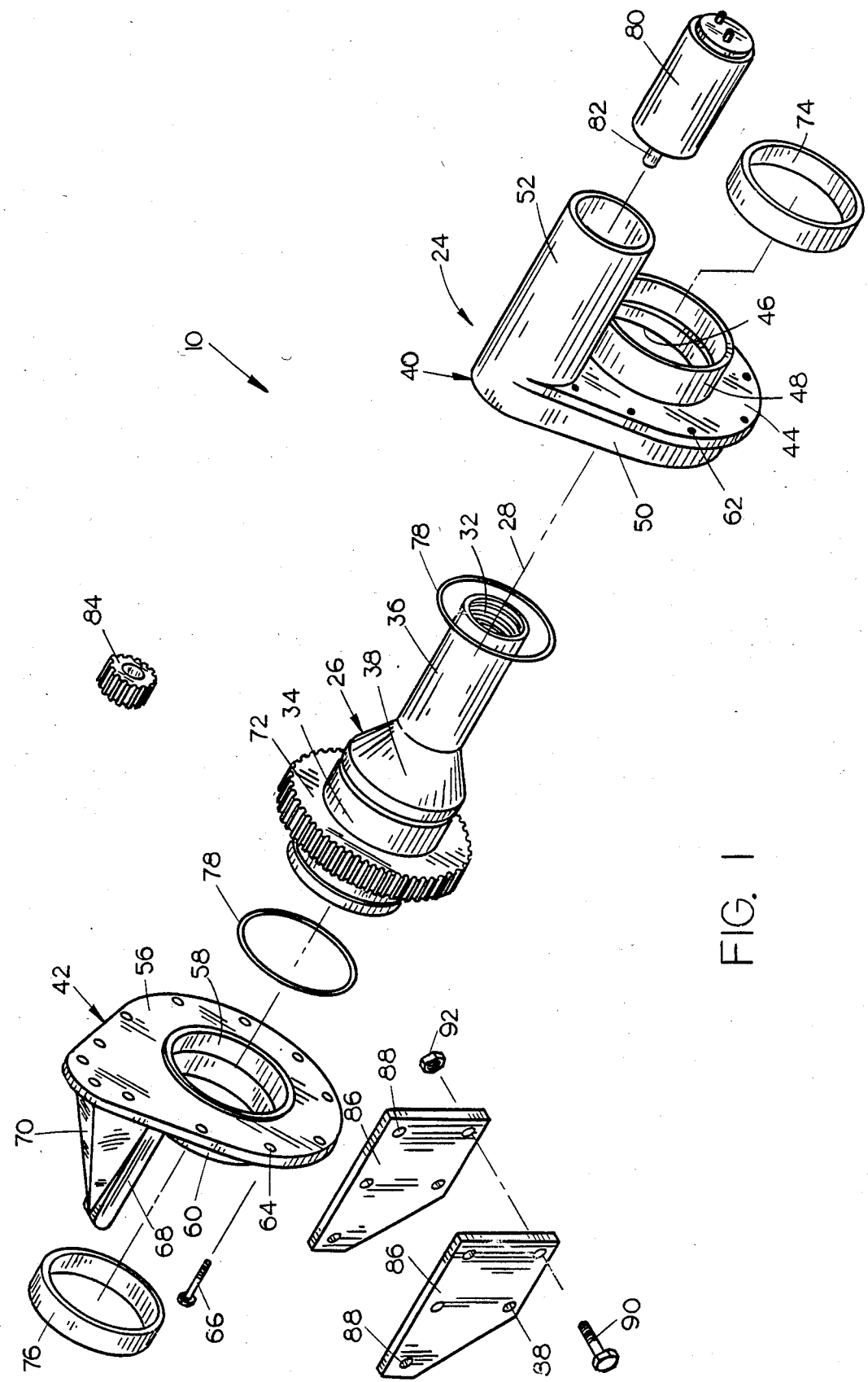
FIG. 1 is an exploded perspective view of the powered adjuster of the invention.

Housing 24 is shown in FIG. 1 as split into two parts including a gear cage 40 and a cover plate 42.

Gear cage 40 includes a first end wall 44 having an opening 46 therethrough, an annular sleeve 48 extended radially from wall 44 about opening 46 for rotatably supporting the drive hub therein, and a peripheral wall 50 extended axially from the opposite side of the first end wall 44 for surrounding the drive gears described hereinbelow. Integrally formed with gear cage 40 is the generally cylindrical motor cage 52 which communicates with a hole 54 through first wall 44 for extension of the motor output shaft therethrough.

Cover plate 42 of the housing includes a second end wall 56 having a second opening 58 therethrough, an annular sleeve 60 extended axially therefrom about opening 58 for rotatably supporting the drive hub. A series of registered holes 62 and 64 are provided about the periphery of first and second end walls 44 and 56 for receiving bolts 66 to secure the housing halves together. Integrally formed with cover plate 42 is an axially extended slide bar 68 which is reinforced by an upwardly flaring gusset plate 70 for a purpose described below.

The large end portion 34 of drive hub 26 may be formed in separate half sections welded to opposite sides of a large spur gear 72. The spur gear is situated between the first and second end walls 44 and 56 so as to axially secure the drive hub 26 relative to housing 24. A pair of brass bushings 74 and 76 are fitted into the housing sleeve 48 and 60 for reducing friction and a pair of seal rings 78 are disposed in annular grooves in the large end portion 34 of the drive hub 26 to prevent leakage of lubricating fluid from the gear cage.

To rotate the drive hub 26 within housing 24, a hydraulic motor 80 is secured within motor cage 52 with the output shaft 82 thereof extended through hole 55 for rotatably supporting the small spur gear 84 in meshed relation with the larger spur gear 72 on drive hub 26.

The step-up gear ratio between gears 84 and 72 is advantageous for both space efficiency and precision adjustment of the upper arm. A gear ratio of between 3/1 and 7/1 is preferred. In a particular embodiment, spur gears of the type designated S-12-72 and S-12-15 were satisfactorily used. Likewise, whereas specific dimensions of the gears are not critical to the present invention, a large gear 72 having a thickness of ⅜ inches and a 6-inch pitch diameter was found satisfactory.

To secure the housing 24 from rotating about the drive hub 26, a pair of guide plates 86 are provided for clamping engagement on opposite sides of the connection member 12. The plates have a plurality of registered holes 88 arranged along parallel lines situated above and below the shank of connection member 12 such that upon insertion of bolts 90 through the registered holes and the tightening of nuts 92 thereon, the guide plates are securely clamped to connection member 12. The slide bar 68 which extends axially from the housing cover plate 42 preferably has a transverse width which approximates the spacing between guide plates 86 so as to be freely axially slidable therebetween. The guide plates secure the housing against rotation, however.

In operation, connection member 14 is connected to a tractor with the opposite connection member 12 being free for connection to an implement three-point hitch mounting means. The hydraulic lines 94 and 96 from motor 80 are connected to the hydraulic control valve on the rearward end of the tractor. It is preferred that an electric over-hydraulic control system be provided whereby the valve can be operated by a solenoid controlled by an electrical toggle switch. The end positions of the switch would correspond to actuation of the motor in opposite directions with the middle switch being neutral. A first switch could be provided adjacent the valve and a second switch remotely situated in the tractor cab for ready operation by a farmer without dismounting from the cab.

Whereas a preferred embodiment of the invention has been disclosed herein, it is apparent that many modifications, substitutions and additions may be made which are within the intended broad scope of the appended claims. For example, the drive hub may be constructed as a collar adapted for securement around and to a conventional upper arm turnbuckle collar. Ball bearings could be substituted for the brass bushings for further frictional reduction. The guide means for preventing rotation of the housing could take on various forms. In the illustrated embodiment, the slide bar 68 may be provided with a replaceable outer wear plate which can be easily and inexpensively replaced during the long useful life of the adjuster.

Thus there has been shown and described a powered adjuster for a three-point hitch upper arm which accomplishes at least all of the stated objects.

I claim:

1. A powered adjuster for a three-point hitch upper arm including first and second oppositely threaded connection members adapted to be threadably received in the opposite ends of a manually adjustable turnbuckle, said adjuster comprising, a housing, a drive hub carried in said housing for rotation about a first axis, said drive hub having opposite ends with oppositely threaded openings arranged concentric with said first axis and adapted for threadably receiving the first and second connection members of a three-point hitch upper arm, a motor, means for supporting said motor on said housing, a drive connection between said motor and drive hub whereby said drive hub is rotated relative to said housing in response to actuation of said motor, and coacting guide means on said housing and attachable to at least one of said first and second connection members of the upper arm for generally preventing relative rotation between said housing and said one of first and second connection members while permitting relative axial sliding movement therebetween.

2. The powered adjuster of claim 1 wherein said motor comprises a reversible hydraulic motor having a pair of hydraulic lines extended therefrom for connection to a remote control valve.

3. The powered adjuster of claim 1 wherein said drive hub includes a relatively large diameter end, an opposite relatively smaller diameter end and a generally frusto-conical medial portion interconnecting said opposite ends.

4. The powered adjuster of claim 1 wherein said coacting guide means comprises a pair of guide plates, means for clamping said pair of plates against opposite sides of said one of said first and second connection members whereby said plates define a slide track therebetween, and a slide bar extending from said housing parallel to said first axis at a position for axial sliding movement between said guide plates.

5. The powered adjuster of claim 4 wherein said guide plates include a plurality of registered holes and said means for clamping comprises a plurality of bolts insertable through said registered holes.

6. The powered adjuster of claim 1 wherein said drive connection comprises a drive gear operatively connected to said motor and a driven gear operatively connected to said drive hub and in meshed relation with said drive gear.

7. The powered adjuster of claim 6 wherein the gear ratio between said driven and drive sprockets is between 3/1 and 7/1.

8. The powered adjuster of claim 6 wherein said housing comprises
- a gear cage comprising a first end wall having an opening therethrough for rotatably supporting said drive hub therein and a peripheral wall extended axially from the opposite side of said first end wall for surrounding said gears,
- a cover plate comprising a second end wall having a second opening therethrough for rotatably supporting said drive hub, and
- means for securing said cover plate to said gear cage to enclose said gears therein.

9. The powered adjuster of claim 8 wherein said means for supporting said motor on said housing comprises a motor cage and means for securing said cage to one of said gear cage and cover plate, said one of said gear cage and cover plate having a hole for extension of an output shaft of the motor therethrough.

10. The powered adjuster of claim 9 wherein said motor cage is integrally formed with said gear cage.

11. The powered adjuster of claim 9 wherein said coacting guide means comprises a slide track, means for securing said slide track to said one of said first and second connection members and a slide bar extending from said housing parallel to said first axis at a position for axial sliding movement within said slide track.

12. The powered adjuster of claim 11 wherein said slide bar is integrally formed with said cover plate.

13. A power adjustable upper arm for a three-point hitch, comprising
- a first connection member having a connector means at one end and male screw threads on the opposite end thereof,
- a second connection member having a connector means at one end and oppositely threaded male screw threads on the opposite end thereof,
- a housing,
- a drive hub carried in said housing for rotation about a first axis, said drive hub having opposite ends with oppositely threaded openings arranged concentric with said first axis and adapted for threadably receiving the first and second connection members,
- a motor,
- means for supporting said motor on said housing,
- a drive connection between said motor and drive hub whereby said drive hub is rotated relative to said housing in response to actuation of said motor, and
- coacting guide means on said housing and attachable to at least one of said first and second connection members for generally preventing relative rotation between said housing and said one of said first and second connection members while permitting relative axial sliding movement therebetween.

* * * * *